Figure 1:
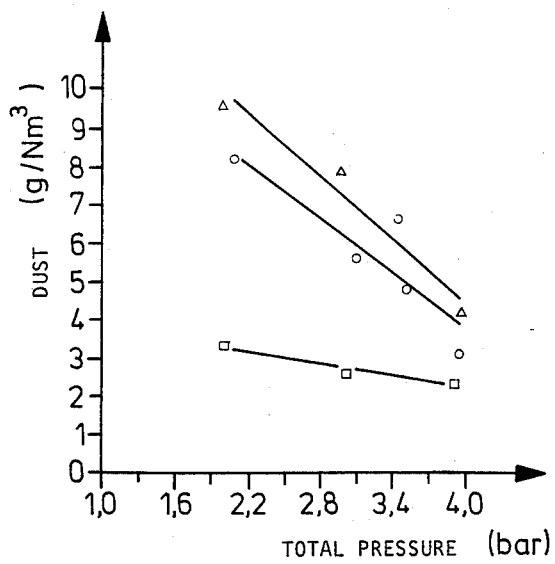

United States Patent [19]

Axelsson

[11] Patent Number: 4,511,372
[45] Date of Patent: Apr. 16, 1985

[54] CARBON GASIFICATION METHOD

[75] Inventor: Carl-Lennart Axelsson, Stockholm, Sweden

[73] Assignee: IPS Interproject Service AB, Bettna, Sweden

[21] Appl. No.: 574,665

[22] Filed: Jan. 27, 1984

Related U.S. Application Data

[63] Continuation of Ser. No. 379,787, May 19, 1982, abandoned.

[30] Foreign Application Priority Data

May 20, 1981 [SE] Sweden .................................. 8103201

[51] Int. Cl.$^3$ ............................................. C10J 3/00
[52] U.S. Cl. ..................................... 48/197 R; 48/92; 48/210; 75/42
[58] Field of Search ............... 48/92, 197 R, 206, 210; 75/42; 282/373

[56] References Cited

FOREIGN PATENT DOCUMENTS 2521080 11/1975 Fed. Rep. of Germany .......... 48/92
2713864  3/1977 Fed. Rep. of Germany .......... 48/92
2750725  5/1979 Fed. Rep. of Germany .......... 48/92

Primary Examiner—Peter Kratz
Attorney, Agent, or Firm—Silverman, Cass & Singer

[57] ABSTRACT

A method of gasifying carbon (C) in the form of coal, hydrocarbons and/or hydrocarbon compounds, comprising the steps of into a reactor vessel holding a molten iron bath to inject carbon, oxygen and iron oxides beneath the surface of the molten iron bath, where the iron oxides constitute a coolant and where carbon is injected in a stoichiometric excess relative to oxygen included in the bath in the form of oxides, and where the molten iron bath has such a carbon content that it solves-in carbon. According to the invention, the reactor vessel is caused to have an inner total pressure of 2 to 50 bar, preferably 4 to 10 bar.

Hereby the gas production and the production of pig iron increase. Furthermore, the dust formation and the lining wear are reduced substantially.

12 Claims, 2 Drawing Figures

CARBON GASIFICATION METHOD

This application is a continuation of application Ser. No. 379,787, filed May 19, 1982, now abandoned.

This invention relates to a method of gasifying carbon.

The invention, more precisely, relates to a method, at which carbon is gasified in a molten iron bath by injecting carbon beneath the bath surface.

Several methods proposing to gasify carbon in a molten iron bath are known. One such method is disclosed in SE-PS No. (Swedish patent application No. 7706876-5), which describes a method of preparing hydrocarbon compounds from carbon (C) in the form of coal including a certain amount of water, hydrocarbon and/or hydrocarbon compounds. According to said method, carbon is injected into a molten bath in a stoichiometric excess relative to oxygen included in the form of oxidic compounds in the molten bath, together with a coolant. The coolant preferably consists of iron oxides in the form of iron ore concentrate when the molten bath consists of molten iron, whereby iron is reduced in the same process.

Slag-forming compounds, such as CaO, also are added.

The heat required for the reduction of iron oxides is taken from the combustion of injected carbon and injected oxygen, at which large amounts of carbon monoxide (CO) and hydrogen gas ($H_2$) are formed.

At the method thus described a pig iron process is combined with a carbon gasification process, whereby great advantages, especially economic ones, are obtained.

At tests with the aforesaid methods it was found, however, that many problems arise when carbon is gasified by means of a molten iron bath. The problems are of such nature that the process cannot be adapted to the production unless the problems are solved.

The problems substantially emanate from one difficulty, viz. to produce a large amount of gas per time unit in relation to the size of the reactor vessel, in which the reactions proceed.

The problems, more precisely, are as follows: to effect a high gas production, to avoid heavy wear of the lining, to establish a good thermal balance and to minimize dust formation.

As regards the difficulty of effecting a high gas production, this is connected with the size of the reactor vessel.

The reactants preferably are supplied by means of a pneumatic injection system, which effects the injection at the bottom of the reactor vessel. In a process, at which gas and powder are injected into a bath of molten iron, the maximum flow of injected material is determined by the gas accumulation capacity of the system. Carbon monoxide (CO) and hydrogen gas ($H_2$) are formed more or less immediately after the injection and thereby give rise to a gas flow, which is disintegrated to small bubbles rising to the bath surface. The height of the bubble column formed increases with increasing supply of reactive components to the system. In the case of a molten iron bath covered with slag, thus, the gas developed must pass through molten metal and slag, whereby both the metal and the slag will increase in height compared with their nominal heights, i.e. when no gas develops. At a certain injection flow the mixture of metal, slag and gas will reach up to the upper edge of the reactor vessel, and metal and slag are thrown out. When this takes place, the upper hydrodynamic limit of the system, as one may call it, is exceeded.

As regards lining wear, this is intimately connected with a high gas production.

A vessel intended to hold a molten iron bath is lined with one or, often, several ceramic materials constituting an insulation. At its contact with metal and slag, the ceramic material is subjected to wear, the mechanisms of which can be divided substantially into chemaical disintegration, erosion and thermal cleavage.

At a process of the kind here concerned the erosion is very substantial and has proved directly responsive to the volumetric gas flow through the reactor vessel. The reason of this is high gas development, i.e. a large volumetric flow yields a forceful stirring of the bath.

The gasification of carbon to CO and $H_2$ contributes heat energy to the system, while the cleavage of iron oxides is an endothermal reaction. It is, however, desired to produce relatively large amounts of pig iron in the reactor vessel, because this results among other benefits in an advantageous turnover of the molten iron bath.

A high pig iron production is advantageous partly because the molten iron bath absorbs impurities from injected carbon and partly because a relatively high pig iron production is a prerequisite for rendering the process economically justifiable.

The necessary heat energy contribution by the carbon gasification reaction, however, is of such a magnitude that, compared with the bath volume, large amounts of carbon must be gasified for rendering the reduction of necessary iron oxides possible.

The three aforesaid problems, thus, would be solved if the gas production can be maintained high in relation to the bath volume.

A great and in one sense decisive problem at carbon gasification is dust formation. It has been known for a long time that large amounts of iron are vaporized when oxygen is injected into a carbonaceous molten iron bath. At top injection by means of the so-called LD-process, the main part of the dust formation can be explained by the so-called bubble-breaking theory.

When, however, oxygen is injected into the reactor vessel from the bottom or from the side, it was found that iron is evaporated at the phase boundary surfaces between metal and gas, owing to the high temperature arising at the reaction between injected oxygen and carbon. The evaporation of iron occurs at the phase boundary surfaces, which are not covered with iron oxide.

All of the aforesaid problems are eliminated or substantially reduced by the present invention.

The present invention, thus, relates to a method of gasifying carbon (C) in the form of coal, hydrocarbon and/or hydrocarbon compounds, comprising the steps of into a reactor vessel holding a molten iron bath to inject carbon, oxygen and iron oxides beneath the bath surface, which iron oxides constitute a coolant and are intended to be reduced, of injecting carbon in a stoichiometric excess relative to oxygen included in the bath in the form of oxides, which molten iron bath has such a carbon content that it dissolves carbon. The method is characterized in that the reactor vessel is caused to have an inner total pressure of 2 to 50 bar, preferably of 4 to 10 bar.

The reactor vessel is manufactured entirely sealed to the surrounding, with the exception of a gas outlet and injection tuyeres nozzles. The gas outlet preferably is provided with an adjustable throttling for rendering pressure control in the reactor vessel possible.

Figure 2:
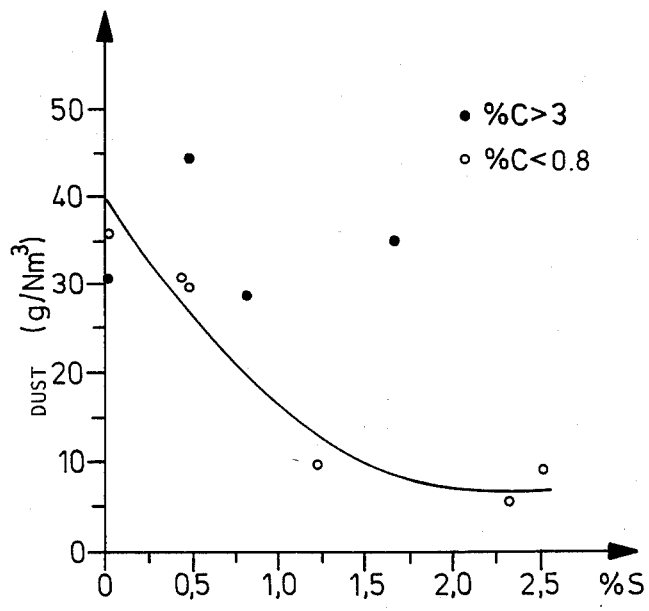

The invention is described in greater detail in the following, partially with reference to the accompanying drawing, in which FIG. 1 is a diagram of the dust content plotted against the total pressure in the reactor vessel, and FIG. 2 is a diagram of the dust content plotted against the sulphur content in the bath.

According to the present invention, the reactor vessel is caused to operate at overpressure, which (total pressure) may be from about 2 bar to 50 bar, depending on the capacity intended, the size of the reactor vessel etc. A preferred pressure range, however, is about 4 to 10 bar and especially about 6 to 8 bar.

The gas volume accumulated in the mixture of metal, slag and gas depends substantially only on the volumetric gas flow. At a constant volumetric gas flow, thus, the mass flow is proportional to the pressure. The amount of carbon injected per time unit, thus, compared with the prevailing of atmospheric pressure, can be increased in direct proportion to the pressure without thereby affecting the size of the accumulated gas volume. This implies that the aforesaid hydrodynamic limit for the reactor vessel, i.e. when metal and slag are thrown out of the reactor vessel, also increases proportionally to the pressure. A substantially higher gas production per time unit, thus, is rendered possible by pressurizing the reactor vessel.

An increased mass flow, as mentioned, can be effected without increasing the volumetric flow. This in its turn implies, that the aforesaid erosion, in spite of increased gas production, can be held constant or is caused to decrease by reducing the volumetric flow, in spite of a mass flow exceeding the mass flow at atmospheric pressure in the reactor vessel, because a decrease in the volumetric flow implies less stirring and thereby lower erosion.

The mass flow is caused to increase by injecting a greater amount of carbon and oxygen. By this greater carbon and oxygen amount a greater heat energy amount is supplied to the bath and is utilized for reducing a greater amount of iron oxides to pig iron. The heat losses through the walls of the reactor vessel are determined by the difference between the inner and outer temperature of the walls, so that a great heat loss does not occur as long as the bath temperature is not increased.

An additional effect on the heat balance is obtained by the increased total pressure. When the volume of a gaseous equilibrium mixture is decreased, the concentration of all components and the total pressure of the mixture increase in a corresponding degree. When the total number of moles of reactants and products according to a reaction formula is different, the numerator and denominator of the concentration fraction are changed in different degrees. The system then is not in equilibrium after the pressure increase. The equilibrium is shifted to that side which represents the smallest number of moles in the reaction formula.

The gas composition obtained by the present process is determined in principle by the reaction $$C(\text{in Fe}) + CO_2(g) \rightleftharpoons 2CO(g) \tag{1}$$

The proportion hydrogen gas/water vapour can be calculated by the so-called shift reaction $$H_2O(g) + CO(g) \rightleftharpoons H_2(g) + CO_2(g) \tag{2}$$

When the total pressure is caused to increase, the reaction (1) is shifted to the left, which also shifts the reaction (2) to the left.

Outgoing gas, thus, at an increased total pressure will include a greater proportion $CO_2$ and $H_2O$ than at atmospheric pressure, and thereby will have a higher combustion degree, which implies an additional heat contribution to the reactor. This additional heat contribution yields an extra reduction potential in the reactor.

Instead of an increased iron reduction, however, an increased proportion of water vapour can be added by injection, which implies an increased proportion of hydrogen gas in the outgoing gas and, thus, enriches the chemical heat content of the gas and increases its $H_2/CO$ relation. This latter effect is favourable in addition to other benefits when the gas, for example, is to be used for methanol production.

At carbon gasification processes of the kind here concerned dust formation is a serious problem. It was mentioned above, that iron is evaporated from the phase boundary surfaces between metal and gas, owing to the very high temperature arising at the reaction between oxygen and carbon.

The total phase boundary surface at constant mass flow in the system decreases with increased pressure, owing to a reduced volumetric flow. This in its turn implies a decrease of the evaporation and dust formation.

FIG. 1 shows by way of example a diagram over the dust content expressed in $g/Nm^3$ plotted against the total pressure expressed in bar (standard atmospheres). The diagram shows three different curves, representing different sulphur contents in the bath and varying amount of injected oxygen. A triangle designates experiments at a sulphur content of 0.92%±0.05% and a carbon content of 0.61%±0.05% and an oxygen flow of 42 Nl/min. A circle designates experiments with the same sulphur content and carbon content, but with an oxygen flow of 2.4 Nl/min. A square designates experiments with a sulphur content of 1.57%±0.19% and a carbon content of 0.11%±0.07% and an oxygen flow of 4.2 Nl/min.

The experiments illustrated in FIG. 1 were carried out on laboratory scale where carbon and oxygen were injected into liquid iron at a temperature of 1550° C.

The diagram shows clearly that the dust formation decreases significantly already at relatively low overpressures. This effect is increased at higher pressures. At a high sulphur content in the bath, the dust formation in general is lower and is affected relatively little by the pressure, compared with when the sulphur content is higher. In the diagram also is shown that at unchanged contents of sulphur and carbon the dust formation decreases with diminishing oxygen flow.

It has been discovered, thus, that a high sulphur content reduces the dust formation significantly at a given carbon content and a given oxygen flow. The sulphur content, isolated from this aspect, must exceed 0.5% to 1.5%, but be lower than 2.0% to 2.5%. A preferred range for the sulphur content is about 0.5% to 2%. FIG. 2 shows the dust content in $g/Nm^3$ plotted against the sulphur content in % in the bath. Filled circles refer to measurements of a molten iron bath with a carbon content exceeding 3%, and unfilled circles refer to a molten iron bath containing less than 0.8% carbon. FIG. 2 refers to conditions at atmospheric pressure.

According to the present invention it is preferred to operate a reactor in the manner described above while the sulphur content in the bath is caused to be about 0.5% to 2% at the same time as the carbon content in the bath is caused to be lower than 3%, preferably below 2%.

The carbon content in the iron bath is controlled by the amount of injected coal in relation to other reactants. The sulphur content in the iron bath is controlled by the amount and type of slag-forming compounds.

It is fully apparent that all problems mentioned in the introductory portion above are eliminated, or in any case substantially reduced, by carrying out the method while pressurizing the reactor vessel. The improvement is accentuated in that the bath is caused to assume the aforesaid sulphur and carbon contents.

By utilizing the invention, thus, the dust formation and the lining wear are reduced substantially. Furthermore, a considerable pig iron production is rendered possible owing to a greater heat energy development in the bath. One of the most essential advantages, however, is that the gas production can be increased substantially.

The invention must not be regarded restricted to the embodiments stated above, but can be varied within the scope of the attached claims.

I claim:

1. In a method for gasifying carbon in the form of coal, hydrocarbons, and/or hydrocarbon compounds, in which carbon, oxygen and iron oxides are injected beneath the surface of a molten iron bath held in a reactor vessel so that the iron oxides constitute a coolant and are intended to be reduced, and the carbon is dissolved in the molten bath, the carbon being injected in a stoichiometric excess relative to the oxygen present in the bath in the form of oxides, the improvement comprising:
   A. maintaining the total pressure in the reactor vessel greater than atmospheric pressure up to 50 bar;
   B. maintaining the carbon concentration in the molten iron bath lower than 3% by weight carbon; and
   C. maintaining the sulphur concentration in the molten ion bath in the range of about 0.5% to 2.5%, thereby enabling increase in the rate of gas production with reduction in dust formation.

2. The method as claimed in claim 1 wherein the sulphur concentration is in the range of about 0.5% to 2%.

3. The method as claimed in claim 2 wherein said total pressure is within the range of about 4 to 10 bar.

4. The method as claimed in claim 1 wherein said total pressure is within the range of about 4 to 10 bar.

5. The method as claimed in claim 4 wherein the carbon concentration is lower than 2%.

6. The method as claimed in claim 1 wherein the carbon concentration is lower than 2%.

7. The method as claimed in claim 1 wherein said total pressure is within the range of about 2 to 50 bar.

8. In a method for gasifying carbon in the form of coal, hydrocarbons, and/or hydrocarbon compounds, in which carbon, oxygen and iron oxides are injected beneath the surface of a molten iron bath held in a reactor vessel so that the iron oxides constitute a coolant and are intended to be reduced, and the carbon is dissolved in the molten bath, the carbon being injected in a stoichiometric excess relative to the oxygen present in the bath in the form of oxides, the improvement comprising:
   A. maintaining the total pressure in the reactor vessel greater than atmospheric pressure up to 50 bar;
   B. maintaining the carbon concentration in the molten iron bath lower than 0.8% by weight carbon; and
   C. maintaining the sulphur concentration in the molten ion bath in the range of about 0.5% to 2.5%, thereby enabling increase in the rate of gas production with reduction in dust formation.

9. The method as claimed in claim 8 wherein the sulphur concentration is in the range of about 0.5% to 2%.

10. The method as claimed in claim 9 wherein said total pressure is within the range of about 4 to 10 bar.

11. The method as claimed in claim 8 wherein said total pressure is within the range of about 4 to 10 bar.

12. The method as claimed in claim 8 wherein said total pressure is within the range of about 2 to 50 bar.

* * * * *

UNITED STATES PATENT AND TRADEMARK OFFICE
CERTIFICATE OF CORRECTION

PATENT NO. : 4,511,372

DATED : April 16, 1985

INVENTOR(S) : CARL-LENNART AXELSSON

It is certified that error appears in the above-identified patent and that said Letters Patent are hereby corrected as shown below:

Column 4, line 41, change "42" to --4.2--.

Signed and Sealed this

Twenty-seventh Day of August 1985

[SEAL]

Attest:

DONALD J. QUIGG

Attesting Officer

Acting Commissioner of Patents and Trademarks